United States Patent Office 3,404,158
Patented Oct. 1, 1968

3,404,158
THIOGLYCIDYL COMPOUNDS
Arthur Jun-Shen Yu, Levittown, Pa., assignor to Thiokol Chemical Corporation, Bristol, Pa., a corporation of Delaware
No Drawing. Filed May 18, 1964, Ser. No. 368,384
3 Claims. (Cl. 260—327)

ABSTRACT OF THE DISCLOSURE

Thioglycidylacrylates of the formula

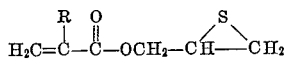

where R is selected from hydrogen and alkyl are disclosed. The thioglycidylacrylates can be polymerized through the ethylenically unsaturated groups thereof to form homopolymers with pendant episulfide groups through which they can be cross-linked. Alternatively, the monomers can be polymerized through the episulfide groups thereof to form homopolymers having pendant unsaturated groups through which they can be cross-linked. Also, the monomers can be polymerized with saturated episulfides to form copolymers having pendant unsaturated groups through which they can be cross-linked. Methods of making the monomers and polymers are disclosed. The polymers and copolymers obtained from the instant monomers have desirable mechanical and physical properties that can be varied as might be suitable for different applications, e.g., as sheet materials or as foams.

---

The present invention relates to a novel class of monomeric episulfide compounds and to polymers comprising monomeric units of these novel compounds. The new monomeric compounds are thioglycidyl acrylates and thioglycidyl alkacrylates.

Early efforts to polymerize episulfides resulted in the production of relatively low molecular weight liquids which were unsuitable for use in molding compounds. More recently it was found that, for example, ethylene sulfide and propylene sulfide can be polymerized to produce relatively higher molecular weight materials than had been previously attained. More particularly, high molecular weight moldable ethylene sulfide and propylene sulfide polymers can be made by utilizing catalysts formed by the reaction of diethyl zinc with water or hydrogen sulfide as disclosed in the copending applications of Riad H. Gobran and Stephen W. Osborn, U.S. Ser. Nos. 165,-034 filed Jan. 8, 1962, and 274,856 filed Apr. 22, 1963, now abandoned in favor of continuation-in-part application Ser. No. 511,341 filed Dec. 3, 1965 for which U.S. Patent No. 3,365,431 was issued. Homopolymers of these episulfides having useful properties can be made in this way. These homopolymers are useful as high temperature molding materials, and when melted may be formed into flexible films. Furthermore, copolymers, for example a copolymer of ethylene sulfide and propylene sulfide, can be similarly made and suitably used in forming molded products.

However, in order to obtain the optimum physical and chemical properties of these polymer systems, it is necessary to cure, i.e. crosslink, the polymers.

Therefore, it is an object of the present invention to provide novel episulfide monomers having reactive groups other than the episulfide group to provide curing sites through which polymers made from the monomers can be cured. It is another object of the invention to provide episulfide monomers that can be homopolymerized to provide readily curable polymeric products and can also be copolymerized with other episulfide compounds to provide copolymeric products that are also readily curable. It is still another object of the invention to provide cured, i.e. crosslinked, homopolymers and copolymers comprising monomeric units of the aforesaid episulfide monomers which cured polymers have desirable mechanical properties. It is a further object of the invention to provide compositions comprising these novel polymeric materials. It is a still further object of the invention to provide methods of making such monomers, homopolymers and crosslinked homopolymers. Other objects of the invention will be in part obvious and in part pointed out hereinafter.

These objects can be substantially attained by making and using novel thioglycidyl acrylate and thioglycidyl alkacrylate compounds of the present invention having the formula

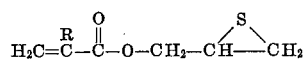

wherein R is hydrogen or an alkyl group, preferably hydrogen or a lower alkyl group such as those having 1 to 4 carbon atoms. These acrylates and alkacrylates, it has been found, may be polymerized to form homopolymers, all of which are referred to hereinafter as polythioglycidyl acrylates or may be copolymerized with other episulfide compounds such as the styrene and alkylene sulfides. Both the copolymers and homopolymers are curable. In the case of the homopolymers, since the present monomers have both a vinyl and an episulfide functional group, their initial polymerization may be restricted to vinyl polymerization or may proceed only through the episulfide groups, depending on the choice of catalyst. In the former case there are residual episulfide groups through which the polymer can be crosslinked, whereas in the latter case there are residual vinyl groups through which the polymer can be crosslinked. Thus the cure, i.e. the crosslinking, may proceed through whichever functional group was not utilized to form the initial polymer.

In the case of the copolymers, polymerization initially proceeds through the episulfide groups and hence crosslinking of the copolymer is effected through residual vinyl groups.

The novel thioglycidyl acrylate and alkacrylates of the present invention may conveniently be prepared by reacting a suitable epoxide compound, such as a glycidyl acrylate or alkacrylate, with potassium thiocyanate as follows:

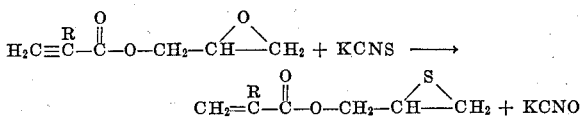

wherein R is hydrogen or an alkyl group. An excess of potassium thiocyanate may be used to assure the completion of the reaction. The reaction is preferably conducted in a solvent, for example acetone, in which both the epoxide compound and the desired product are soluble and in which the potassium cyanate formed in the reaction and potassium thiocyanate are substantially insoluble. In this procedure, most of the potassium cyanate precipitates from the reaction medium as it forms, thus tending to drive the reaction to completion. The solid byproducts of the reaction, unreacted potassium thiocyanate and the potassium cyanate, can readily be removed from the reaction system by filtration. The solvent is suitably separated from the desired products by distillation.

Homopolymers of the novel monomers and curable copolymers incorporating these monomers can be prepared by polymerizing the monomer or monomers in the presence of about 0.05 to 10%, based on the weight of the monomer charge, of a catalyst adapted to promote polymerization through the episulfide groups, such as cadmium hydroxide or zinc hydroxide as disclosed in the commonly owned and copending applications of E. L. Kutch, S. W. Osborn, and T. F. Wells III, "Cadmium Salt Catalytic Process" Ser. No. 255,675 filed Feb. 1, 1963, now abandoned in favor of continuation application Ser. No. 591,032 filed Oct. 31, 1966 for which U.S. Patent No. 3,337,513 was issued, and "Zinc or Mercury Salt Catalytic Process," Ser. No. 269,774 filed Apr. 1, 1963, now abandoned in favor of continuation application Ser. No. 598,877 filed Dec. 2, 1966 for which U.S. Patent No. 3,359,248 was issued. The metal salts advantageously used as catalysts are hydroxides, sulfides, silicates, oxides, acetates, sulfates, and carbonates of cadmium; and peroxides, sulfides, chromates, adipates, oxalates, oxides, hydroxides, and carbonates of zinc and mercury. These catalysts may be used singly or in combination with one another.

The copolymers of the present invention are prepared from one or more monomers which are free from ethylenic unsaturation and have a polymerizable thiiranyl group and thioglycidyl acrylate or thioglycidyl alkacrylates. At least one carbon of the thiiranyl group of the ethylenically saturated monomer should desirably have substituents of rather low molecular weight, for example hydrogen or lower alkyl groups such as ethyl; this permits polymerization without an excessive degree of steric hindrance reducing the yield of polymer.

Co-monomers that may advantageously be reacted with the novel monomers of the invention to form interpolymers include alkylene sulfides such as ethylene sulfide, propylene sulfide, 1, 2 and 2, 3 butylene sulfide, vinyl cyclohexane episulfide, and isobutylene sulfide, as well as cyclohexene sulfide, 2-benzyl thiirane, para-methyl styrene episulfide, and styrene sulfide. In general, episulfides of the formula

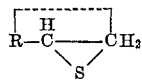

wherein R is chosen from the group consisting of alkyl, hydrogen, aryl, alkaryl, alkylene, aralkyl or cycloalkyl, are useful as co-monomers. The dotted line of the general formula represents the formation of cyclic configurations within the molecule by alkylene groups. One such cyclic compound is cyclohexene sulfide of the formula

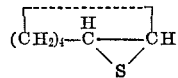

These polymerization processes can be conveniently conducted in the presence of water and/or organic solvents such as benzene and acetone, etc. The reaction proceeds suitably at temperatures of about 20° to 80° C. The reaction time may vary from 1 hour to 3 days or more, depending upon the monomers used, the reaction temperature, etc.

During the polymerization using the cadmium, mercury or zinc compounds referred to above as catalysts, the episulfide rings open and polymerization proceeds through the episulfide sites. The vinyl groups do not enter the polymerization reaction when using these catalysts and therefore the ethylenic bonds remain intact and available for subsequent crosslinking reactions which may be catalyzed by free-radical catalysts and the like. Thus, for example, when thioglycidyl acrylate is polymerized in this way, the polymerization proceeds in such manner as to form an essentially linear polyethylene sulfide chain with spaced pendant groups having vinyl terminals through which crosslinking can be effected.

On the other hand, if the novel monomers of the present invention are polymerized with the aid of a free-radical polymerization catalyst, for example a peroxide or a material such as azobisisobutyronitrile, vinyl polymerization proceeds through the vinyl groups of the monomers in such a manner as to form an essentially linear hydrocarbon chain with spaced pendant groups, each such group containing a terminal episulfide group. The reaction conditions used can be those conventionally used in carrying out vinyl polymerizations but preferably the reaction is carried out at temperatures of up to 60–65° C. The episulfide rings remain closed and unaffected during the reaction and are available for subsequent crosslinking reactions catalyzed by the zinc, cadmium or mercury episulfide-ring-opening catalysts mentioned above.

The homopolymers of thioglycidyl acrylates and thioglycidyl alkacrylates which have been polymerized through the episulfide group may be crosslinked, i.e. cured, by reacting pendant vinyl bonds in the presence of a suitable vinyl polymerization catalyst such as a free-radical catalyst. The resulting three-dimensional crosslinked polymer network is highly resistant to solvent attack.

Homopolymers of the thioglycidyl acrylate and alkacrylates which have been polymerized through the vinyl bonds of the monomer may be suitably crosslinked by reacting pendant episulfide groups thereof with metal hydroxides, oxides, etc. mentioned above. The crosslinked polymers so formed also are exceptionally solvent resistant.

Thioglycidyl alkacrylates and thioglycidyl acrylate, when copolymerized through episulfide groups with ethylene sulfide or any of the saturated co-monomers mentioned above, form novel copolymers having a sulfide-containing chain and spaced pendant groups with olefinic unsaturation. The pendant groups having olefinic unsaturation may, of course, be reacted in the presence of a vinyl polymerization catalyst causing the formation of a crosslinked polymer network as described above in reference to the thioglycidyl acrylate and thioglycidyl alkacrylate homopolymers.

The ethylenic bond of thioglycidyl acrylate type compounds is relatively reactive in comparison to the ethylenic bond of such compounds as allylthioglycidyl ether.

Thus, episulfide polymers formed by reaction of the episulfide groups of thioglycidyl acrylate and/or thioglycidyl alkacrylates can be further reacted through their ethylenic unsaturated groups, with ethylenically-unsaturated monomers like styrene and methyl methacrylate to form tough crosslinked plastic materials having excellent mechanical properties. By use of blowing agents known to the art, these plastic materials may be obtained in the form of foams. Although catalysts known to the art to be useful for promotion of vinyl-type polymerization are generally useful in this polymerization, the preferred catalyst for forming foams is azobisisobutyronitrile which forms nitrogen gas on decomposing during the reaction and thus obviates the necessity for using a separate blowing agent.

Thus it is seen that the novel monomers of the present invention are adaptable to be polymerized, easily crosslinked by different reactions, and may be formed into curable copolymers of various properties.

In order to point out more fully the nature of the present invention, the following specific examples are given as illustrative embodiments of the present products and processes by which they are produced.

Example 1

A mixture containing 790 grams of acetone, 425.5 grams of glycidyl acrylate, 400 grams of anhydrous potassium thiocyanate and 0.5 gram of hydroquinone, a stabilizer for glycidyl acrylate, was prepared in a two-liter flask equipped with a reflux condenser and an agitator. The mixture was heated to refluxing temperature and refluxed for 16 hours, during which time the reactants were stirred constantly.

After 16 hours, the reactants were cooled to room temperature and filtered to remove the solids, potassium cyanate and potassium thiocyanate. The acetone was then removed by vacuum distillation. As the acetone was removed, more solid matter precipitated and was also removed by filtration.

The remaining liquid product was fractionally distilled through an 18-inch Vigreux column. That fraction boiling at from 53° to 62° C. and 0.2 mm. of Hg absolute pressure was thioglycidyl acrylate and weighed 166.6 grams, 35% of the theoretically possible yield.

A more highly purified product was obtained on redistillation. This latter product had a boiling point of 59° C. at 0.2 mm. Hg absolute pressure and a density of 1.134 grams per ml. at 25° C. The refractive index, $n_D^{25}$, was 1.5030. The molecular refractivity, $M_D$, was experimentally determined to be 37.53. The theoretical $M_D$ is 36.76 computed by the relationship $$M_D = \frac{\text{refractive index}^2 - 1}{\text{refractive index}^2 + 2} \times \frac{\text{molecular weight}}{\text{specific gravity}}$$

A chemical analysis confirmed the product to be thioglycidyl acrylate:

Theoretical: C, 50.00%; H, 5.56%; S, 22.22%; O, 22.22%. Experimental: C, 50.06%; H, 5.56%; S, 21.91%; O, 22.03%. The product obtained contained less than one percent impurities as determined by gas chromatography.

Example 2

A mixture containing 320 grams of acetone, 142 grams of glycidyl methacrylate, and 116.6 grams of potassium thiocyanate was added to a reactor. The mixture was allowed to react for 16 hours at 60° C. while being constantly agitated. After the 16 hours, the reactants were cooled to about 25° C. and the residual solid potassium salts were removed by filtration. The filtrate was washed with water.

The remaining material was dried and vacuum distilled through an 18-inch Vigreux column. That fraction of the product boiling at 71° to 75° C., at 0.8 mm. Hg absolute pressure, weighed 102 grams and represented a theoretical yield of 64% thioglycidyl methacrylate.

A middle fraction of the distilled material was found to have a refractive index, $n_D^{25}$, of 1.4987 and a density of 1.1103 grams per ml. at 25° C. The molecular refractivity $M_D$, was experimentally determined to be 41.82; the theoretical $M_D$ is 41.59. A chemical analysis confirmed the product to be thioglycidyl methacrylate:

Theoretical: C, 53.15%; H, 6.37%; S, 20.27%; O, 20.22%. Calculated: C, 52.92%; H, 6.33%; S, 20.24%; O, 20.03%.

Example 3

Twenty-nine grams of thioglycidyl acrylate prepared according to the procedure of Example 1 and 0.3 gram of 75% solution of t-butyl peroxypivalate in mineral spirits, a free-radical catalyst-containing composition that is sold under the trade name Lupersol #11, were charged to a polymerization reactor containing 50 ml. of benzene. The reactants were heated for 2 hours at 60° to 65° C. A gel-like product formed and was removed from the vessel, washed with methanol, and dried under vacuum at 40° C. The product consisted of 22.8 grams of the homopolymer of polythioglycidyl acrylate. Ten grams of the polymer were mixed on a laboratory rubber mill with 0.1 gram of cadmium hydroxide. The mixed material was cured at 110° C. for 16 hours. A hard rubber was obtained which was treated with chloroform in a Soxhlet extractor for 16 hours. There was no weight loss during this treatment. Uncrosslinked polymer is soluble in chloroform; therefore the resistance of the material to this treatment proved that the hard rubber compound was a stable crosslinked polymer.

Example 4

Some benzene was dried by refluxing and distilling over sodium. Twelve grams of thioglycidyl methacrylate prepared according to the procedure of Example 2, 0.1 gram of cadmium hydroxide and 63 grams of the dried benzene were placed in a polymerization reactor and heated therein at 65° C. for 24 hours.

A small sample of the reactor contents was then taken from the reactor and tested for solubility in petroleum ether. The sample was found to be soluble. This solubility indicated that no polymer had formed during the 24-hour period. The same test was applied and the same results obtained after 4 additional hours of heating in the reactor at 80° C. At this time, another 0.1 gram of cadmium hydroxide was added to the reactor and the reactants heated for 17 additional hours at 80° C. Polymer formed during this period. This polymer, an uncured homopolymer, was a milk white, tack-free elastomer which was completely soluble in chloroform.

A sample of 30 mls. of the reactor contents, now containing some homopolymer, was removed from the reactor and 0.1 gram of the curing agent 2, 5-dimethyl-2, 5-di(tertiary butylperoxy) hexane, a free-radical catalyst useful in promoting vinyl polymerization, was added to the 30 ml. sample. The benzene was evaporated from the sample leaving a solid material. This solid was cured for 16 hours at 120° C. When the solid was extracted with chloroform for 24 hours, no weight loss occurred, thus indicating the substantial completion of the cure of the homopolymer by intersecting vinyl bonds on pendant chain branching of the homopolymer.

The yield of polythioglycidyl methacrylate was 36.6% of the theoretically possible yield.

Example 5

Some dry benzene was prepared by refluxing and distilling over sodium. Twenty grams of thioglycidyl acrylate prepared according to the procedure of Example 1, 0.1 gram of cadmium hydroxide and 63 grams of the dry benzene were placed in a polymerization reactor and heated therein at 65° C. for 24 hours.

A small sample of contents of the reactor was then taken from the reactor and tested for solubility in petroleum ether. The sample was found to be soluble. This indicated that no polymer had formed during the 24-hour period. The same test was applied and the same results obtained after 4 additional hours at 80° C. At this time, another 0.1 gram of cadmium hydroxide was added to the reactor and the reactants heated for 17 additional hours at 80° C. Polymer formed during this period. This polymer, an uncured homopolymer, was a milk white, tack-free elastomer which was completely soluble in chloroform.

Thirty mls. of solution were removed from the reactor and 0.1 gram of the curing agent 2, 5-dimethyl-2, 5-di(tertiary butyl peroxy) hexane, a free-radical catalyst useful in promoting vinyl polymerization, was added to the 30 ml. portion. The benzene was removed by evaporation from the solution and the resulting solid was cured for 16 hours at 120° C. When the solid was extracted with chloroform for 24 hours, only 5.5% weight loss was suffered, thus indicating the substantial completion of the cure of the homopolymer by interacting vinyl bonds on pendant chain branching of the homopolymer.

The yield of polythioglycidyl acrylate homopolymer was 63.0% based on the theoretically possible yield.

Ten grams of the uncured polythioglycidyl acrylate was dissolved in 20 grams of styrene, and 0.5 gram of azobisisobutyronitrile was stirred into the solution. The solution was heated at 80° C. for 2 hours during which time a rigid foam formed. The foam was washed with methanol, dried, and extracted with boiling benzene in a Soxhlet extractor for 16 hours. Less than 1% of the foam-polymer was extracted. This resistance to benzene indicated a highly cross-linked polymer. The homopolymer of thioglycidyl acrylate was soluble in benzene at room temperature.

Example 6

A mixture containing 73.8 grams of propylene sulfide, 0.36 gram of thioglycidyl acrylate prepared according to the procedure of Example 1, 0.2 gram of cadmium hydroxide, and 325 grams of benzene was placed in a polymerization reactor. The mixture was reacted at 50° C.±3° C. for 60 hours during which time a copolymer of propylene sulfoxide and thioglycidyl acrylate was formed. The contents of the reactor were poured into one liter of petroleum ether. The polymer product was then washed twice with petroleum ether and dried to a constant weight of 61.5 grams indicating an 83% yield of the propylene sulfide thioglycidyl acrylate polymer.

Example 7

A mixture containing 77.0 grams of propylene sulfide, 2.1 grams of thioglycidyl acrylate prepared according to the procedure of Example 1, 0.2 gram of cadmium hydroxide, and 325 grams of benzene was placed in a polymerization reactor. The mixture was reacted at 50° C. ±3° C. for 60 hours during which time a copolymer of propylene sulfide and thioglycidyl acrylate was formed. The resulting composition was poured into one liter of petroleum ether. The polymeric product was then washed twice with petroleum ether and dried to a constant weight of 63.5 grams indicating an 83.8% yield of the propylene sulfide thioglycidyl acrylate polymer.

Fifty grams of the above copolymer was mixed on a rubber mill with 5 grams of stearic acid, 25 grams of carbon black and 2 grams of dicumyl peroxide. During the milling operation, the copolymer became noticeably tougher. After milling, the sample was heated for 20 minutes at 310° F. The physical properties of the copolymer thus cured were as follows:

| | |
|---|---|
| Tensile, p.s.i. | 57 |
| Hardness, Duro, Shore A | 14 |
| Elongation, percent | 200 |
| Modulus (p.s.i. at 100% strain) | 40 |
| Modulus (p.s.i. at 200% strain) | 57 |

Then the cured copolymer was subjected to extraction by carbon tetrachloride at 50° C. for over 19 hours, 57.4% of the copolymer remained undissolved. Inasmuch as the uncured copolymer is completely soluble at room temperature in carbon tetrachloride, it was clear the cured copolymer was crosslinked.

Example 8

A mixture containing 51 grams of propylene sulfide, 22.5 grams of ethylene sulfide, 27 grams of thioglycidyl acrylate prepared according to the procedure of Example 1, 0.2 gram of cadmium hydroxide and 400 ml. of benzene was placed in a polymerization reactor, agitated at 50° C. for 17¼ hours, and then at 65° C. for another 17¼ hours. The contents were then cooled and precipitated in methanol. The copolymers were left in the methanol for 3 days before being washed and dried under vacuum at 50° C.

The product, a solid, elastomeric, terpolymer of propylene sulfide, ethylene sulfide, and thioglycidyl acrylate weighed 76.6 grams. The weight corresponded to 73% of the theoretically possible yield.

Example 9

A mixture containing 69 grams of 1,2 butylene sulfide, 0.4 gram of zinc hydroxide and 150 grams of distilled water was placed in a reactor and agitated at 65° (±3° C.) for 17 hours. During this time a polymer of butylene sulfide was formed.

A second mixture containing 79.2 grams of 1,2 butylene sulfide, 14.4 grams of thioglycidyl acrylate prepared according to the procedure of Example 1, 0.4 gram of zinc hydroxide, and 150 grams of distilled water was placed in a reactor and also agitated at 65 C. (±3° C.) for 17 hours. During this time a copolymer of butylene sulfide and thioglycidyl acrylate was formed.

Each polymeric material was precipitated separately in 200 cc. portions of methanol and then dissolved separately in 200–300 cc. portions of benzene. The polymers were then reprecipitated in 2200 cc. of methanol, washed with methanol three times, fresh methanol being used for each wash. The copolymers were then dried for 20 hours in a vacuum oven set at 50° C.

The two polymeric products were each heated separately at 150° C. for 20 hours in the presence of 0.5% of 2,5-dimethyl-2,5-di(tertiary butyl peroxide) hexane. The polymer which contained no thioglycidyl acrylate units did not cure. The product of the second reaction mixture, i.e. the copolymer containing thioglycidyl acrylate, cured.

Example 10

Two mixtures each containing 29.3 grams of styrene sulfide, 14.8 grams of thioglycidyl acrylate prepared according to Example 1, 34.8 grams of 1,2 butylene sulfide, 320 ml. of benzene, and 0.158 gram of cadmium hydroxide were placed in separate reactors and agitated for 4 days at 50° C. in which time a terpolymer of styrene sulfide, butylene sulfide and thioglycidyl acrylate formed. One reactor, designated Reactor A, was then opened, the contents poured into 2 liters of methanol, and the terpolymer product thereby separated from the rest of the mixture. A viscous oily terpolymer product was obtained.

Reactor B was also opened at this time and 7 to 10 ml. of its contents were added to 2 liters of methanol causing a small amount of a viscous oily terpolymer to be precipitated. Reactor B was resealed and placed in a water bath set at 80° C. for an additional 21 hours whereupon it was cooled to room temperature and its polymeric contents were precipitated in 2000 ml. of methanol and washed with petroleum ether.

The terpolymer products of Reactors A and B were each dissolved in 100 ml. of benzene and the two solutions were combined. The combined solution was treated with 1800 ml. of petroleum ether causing the polymeric products to precipitate. After the ether was decanted off, the combined solution was treated again with petroleum ether to remove any remaining polymer. The resultant terpolymer mixture was then purified by redissolving it in benzene and recovered by removing the benzene under 10–15 mm. Hg at 35 to 40° C. for 3 hours. The combined yield of terpolymer products from Reactors A and B was 68 grams.

At this point, two 5-gram samples of the terpolymer mixture were placed in two separate aluminum dishes. To one of the dishes 0.2 gram of azobisisobutyronitrile was added. Each sample was placed in an oven at 90° C. for about 16 hours. During this period the sample which contained the azobisisobutyronitrile cured to a solid elastomer whereas the sample which had not been mixed with the azobisisobutyronitrile remained a viscous oily material.

A further extraction test was run to demonstrate the cure of the polymer formed in the presence of azobisisobutyronitrile. Into two extraction thimbles were weighed 1.998 grams of the uncured terpolymer and 1.761 grams of the polymer cured with the azobisisobutyronitrile. The contents of each thimble were extracted for 28 hours with 250 ml. of benzene. The residual materials from each thimble were air dried for 4 days, then vacuum dried at 50° C. for about 20 hours and reweighed. The residue of the polymer formed without azobisisobutyronitrile was 0.034 gram of 1.7% of the original sample weight. The residue of the polymer formed with azobisisobutyronitrile was 1.093 grams of 62.2% of the original sample weight, indicating a substantially cured polymer.

Example 11

Two sealable, 30-ounce polymerization bottles were each cleaned, dried and charged with 94.5 grams of propylene sulfide, 7.0 grams of thioglycidyl methacrylate prepared according to the procedure of Example 2, 400 ml. of benzene, and 0.2 gram of cadmium hydroxide. The bottles were then capped and placed in a water bath at 49° ±3° C. for about 65 hours during which time a copolymer of thioglycidyl methacrylate and propylene sulfide formed in the reactor. After removal from the bath, the reaction mix was poured into 1400 ml. of methanol causing the precipitation of the copolymer. The copolymer was washed with water, then, after the particle size was reduced by mechanical means, dried for 19 hours at room temperature and 2 additional hours at 40° C. The two samples yielded 91.9 grams (93.5%) and 89.0 grams (92.0%) of polymer respectively. These yields represented 93.5% and 91%, respectively, of the yields theoretically possible.

Example 12

A clean, dry 30-ounce reaction bottle was charged with 175 ml. of reagent grade benzene, 31.6 grams of thioglycidyl methacrylate prepared according to Example 2, 12 grams of ethylene sulfide and 0.2 gram of $Cd(OH)_2$. The bottle was capped and placed in a rotating bath for 16 hours at 80° C. during which time a solid copolymer of thioglycidyl methacrylate and ethylene sulfide was formed. At the end of this interval the bottle was removed and uncapped. The solid reaction product was filtered off, washed with methanol, and dried under vacuum at 50° C. The filtrate was evaporated under vacuum at 60° C. and washed with petroleum ether to remove residual traces of the polymeric product. The polymer was a solid elastomer and had a melting point of 230–250° C. and yield of 27.6 g. The yield of this polymer was 65% of that theoretically possible.

Example 13

A clean, dry 30-ounce polymerization bottle was charged with the following: 90 ml. of benzene, 10 grams of styrene sulfide, 10 grams of thioglycidyl methacrylate prepared according to Example 2, and 0.2 gram of cadmium hydroxide. The bottle was then sealed and reacted for 16 hours in a 65° C. water bath during which time a copolymer of thioglycidyl acrylate and styrene sulfide formed in the reactor. Upon cooling, the contents were transferred into 800 ml. of petroleum ether precipitating the polymer. The size of the polymer product was reduced mechanically; the polymer was then washed twice with separate 500 ml. portions of methanol and dried to a constant weight under vacuum. The yield was 52.5% of that theoretically possible.

The copolymer was dissolved in chloroform and 0.25 gram of benzoyl peroxide was added to the solution. The chloroform was then evaporated and the residual polymer sample was placed in an oven to cure at 120° C. for 19 hours. Upon extraction with chloroform the cured polymer retained 47.3% of its weight indicating that the heating in the presence of benzoyl peroxide caused a cure of the copolymer.

Example 14

A glass reaction vessel was purged with nitrogen and charged with 400 ml. of benzene, 85.14 grams of propylene sulfide, 15 grams of thioglycidyl acrylate, and 0.2 gram of cadmium hydroxide. The vessel was sealed and the contents agitated at 60° C. for 64 hours. After the 64-hour period, during which time a polymer of propylene sulfide and thioglycidyl acrylate formed, the vessel was cooled and allowed to remain at room temperature for 24 hours. At the end of the 24-hour period, the contents were poured into 2000 ml. of methanol causing a solid polymeric product to precipitate. This product was recovered by decanting off the liquid. The solid product was washed with petroleum ether, dried to a constant weight under vacuum, and found to be 78% of the quantity of copolymer theoretically obtainable from a complete reaction of monomers charged to the vessel.

One part by weight of the copolymer was heated for 30 minutes at about 65° C. with 3 parts by weight of styrene. During this 30-minute period the polymer dissolved in styrene. 0.1 part of azobisisobutyronitrile was added to the solution and the mixture was heated at between 60° C. and 70° C. for 16 hours. At the end of the 16-hour period, during which time ethylenically unsaturated sites on the copolymer reacted with styrene to form a crosslinked terpolymeric material, the reactants were found to have formed a tough rigid crosslinked plastic foam.

Example 15

One part by weight of the solid copolymer of propylene sulfide and thioglycidyl acrylate as prepared in Example 14, was heated for 30 minutes at about 65° C. with 3 parts by weight of methyl methacrylate. During this 20-minute period the polymer dissolved in the methyl methacrylate. 0.1 part of 2,5-dimethyl-2,5-di(tertiary butyl peroxy) hexane was added to the solution and the mixture was heated at between 60° C. and 70° C. for 16 hours. At the end of the 16-hour period, during which time ethylenically unsaturated sites on the copolymer reacted with the methyl methacrylate monomer to form a crosslinked terpolymeric material, the reactants were found to have formed a tough bubble-free plastic mass.

Example 16

A glass reaction vessel was purged with nitrogen and charged with 400 ml. of benzene, 85.14 grams of propylene sulfide, 15 grams of thioglycidyl methacrylate, and 0.2 grams of cadmium hydroxide. The vessel was sealed and the contents agitated at 60° C. for 64 hours. After the 64-hour period, during which time a copolymer of propylene sulfide and thioglycidyl methacrylate formed, the vessel was cooled and allowed to remain at room temperature for 24 hours. At the end of the 24-hour period, the contents were poured into 2000 ml. of methanol causing a solid polymeric product to precipitate. This product was recovered by decanting off the liquid. The solid product was washed with petroleum ether, dried to a constant weight under vacuum, and found to be 93% of the quantity of copolymer theoretically obtainable from total reaction of all reactants originally charged to the vessel.

One part by weight of the solid copolymer was heated for 30 minutes at about 65° C. with 3 parts by weight of styrene. During this 30-minute period the polymer dissolved in styrene. 0.1 part of azobisisobutyronitrile was added to the solution and the mixture was heated at between 60° C. and 70° C. for 16 hours. At the end of the 16-hour period, during which time ethylenically unsaturated sites on the copolymer reacted with the styrene to form a crosslinked terpolymeric material, the reactants were found to have formed a tough rigid crosslinked plastic foam.

Example 17

One part by weight of the solid copolymer of propylene sulfide and thioglycidyl methacrylate as prepared in Example 16, was heated for 30 minutes at about 65° C. with 3 parts by weight of methyl methacrylate. During this 30-minute period, the polymer dissolved in the methyl methacrylate. 0.1 part of 2,5-dimethyl-2,5-di(tertiary butyl peroxy) hexane was added to the solution and the mixture was heated at between 60° C. and 70° C. for 16 hours. At the end of the 16-hour period, during which time ethylenically unsaturated sites on the copolymer reacted with the methyl methacrylate monomer to form a crosslinked terpolymeric material, the reactants were found to have formed a tough bubble-free plastic mass.

It is of course to be understood that the foregoing examples are intended to be illustrative and that numerous changes can be made in the ingredients, proportions, and conditions set forth therein without departing from the spirit of the invention as defined in the appended claims.

Thus minor amounts of various other monomers can be copolymerized with the aforementioned monomers. Some such episulfide monomers are vicinal episulfides, such as butadiene monoepisulfide and 1,2-epoxy-3,4-epithiobutane; cyclic sulfides having the structure:

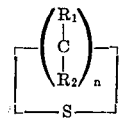

wherein $n=3$ to 6, and $R_1$ and $R_2$ may be heterocyclic, alicyclic, bicyclic, polycyclic and may be H, lower branched or linear alkyl groups having from 1 to 10 carbon atoms, aryl, arylalkyl and/or alkylaryl groups, for example trimethylene sulfide, pentamethylene sulfide and hexamethylene sulfide.

Among useful compounds containing ethylenic unsaturation, i.e., $CH_2=C<$, are ethylene, propylene, butylene and isobutylene; conjugated and non-conjugated dienes such as butadiene; isoprene and 1,4-pentadiene; and vinyls such as styrene, vinyl acetate, ethyl acrylate, methyl acrylate, methyl methacrylate, butyl acrylate, acrylonitrile, vinyl isobutyl ether, methyl styrene, hydroxy propyl methacrylate, tetrafluoroethylene, chlorotrifluoroethylene and hexafluoropropylene.

Compounds also may be used having the structure:

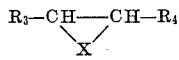

in which X is O or NH and $R_3$ and $R_4$ may be H, a lower branched or linear alkyl group having from 1 to 10 carbon atoms, an aryl, an arylalkyl and/or an alkylaryl group. $R_3$ or $R_4$ may also be heterocyclic, alicyclic, bicyclic or polycyclic, for example styrene oxide, ethylene oxide, propylene oxide, 1,2-butylene oxide, 2,3-butylene oxide, ethylene imine and propylene imine; and other polymerizable compounds like formaldehyde, trioxane, hydroxyisobutyric acid, tetrahydrofuran, 1,3-dioxolane 1,4-dioxane, trimethylene oxide, tetramethylene oxide and pentamethylene oxide.

I claim:
1. Thioglycidylacrylates of the formula

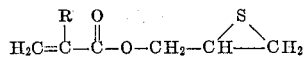

wherein R is selected from the group consisting of alkyl groups of 1 to 4 carbon atoms and hydrogen.

2. The compound of the formula

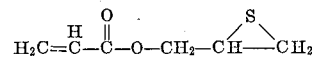

3. The compound of the formula

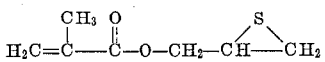

References Cited

UNITED STATES PATENTS

| 2,094,837 | 10/1937 | Dachlauer | 260—327 |
| 2,660,563 | 11/1953 | Banes et al. | 260—327 |
| 2,949,474 | 8/1960 | Murdock et al. | 260—327 |
| 3,265,672 | 8/1966 | Pariser et al. | 260—79.7 |

JAMES A. PATTEN, *Primary Examiner.*